Patented Oct. 19, 1937

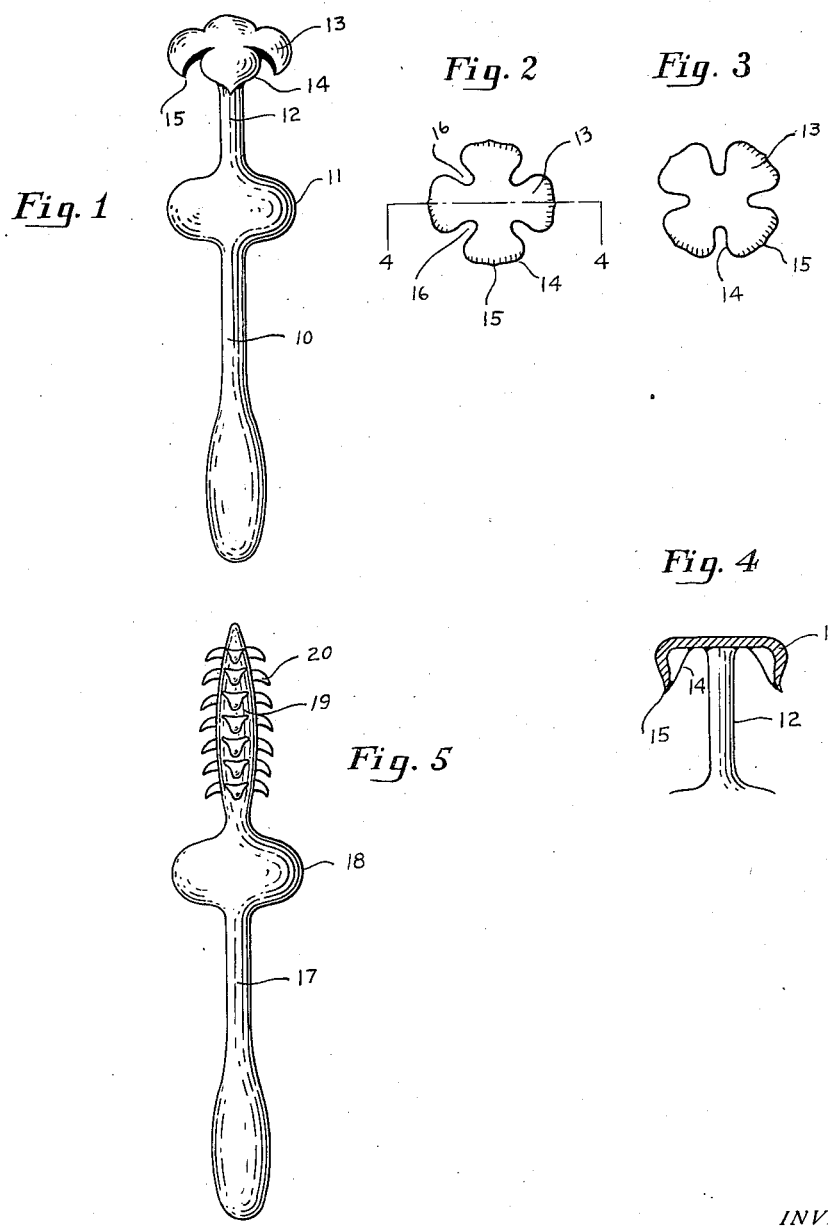

2,096,162

UNITED STATES PATENT OFFICE 2,096,162

NOSE CLEANING IMPLEMENT

Frank J. Daley, Stamford, Conn.

Application October 8, 1936, Serial No. 104,575

12 Claims. (Cl. 128—357)

This invention relates to a nose cleaning implement adapted especially for use in cleaning the nostrils of infants.

In an implement of the class described, it is necessary that the cleaning be done gently in order not to hurt the delicate membranes on the inner surface of an infant's nostril. It is further important that the implement operate without hindering the breathing of the infant while a nostril is being cleansed. It is further necessary to so arrange the tool that but one or two insertions will be necessary to completely cleanse the nostril, so as not to prolong the cleansing operation. I believe that my invention successfully meets the above requirements, as well as others which need not be particularly indicated here.

I employ a nose cleaning implement which is preferably made of one piece of rubber, although, as may be readily appreciated, the implement may be made of separate pieces properly put together. In the preferred form of my invention, the implement is in the form of a stem with an abutment to limit the insertion of the implement into the nostril. At the end of the stem, there is preferably formed a series of leaves which are preferably in the form of a clover leaf, and which form the nostril cleaning portion of my implement. Each of these leaves is curved and preferably terminates in a feather edge, the feather edges in turn running to a point. The leaves are purposely arranged to form a clover leaf, so that the spaces between the leaves will allow for breathing through the nostril, even when the implement is inserted therein.

Also, it will be appreciated that the leaves will force back into the nostril, the material to be cleaned from the nostril, as the tool is first inserted into the nostril. When the tool has been inserted as far as necessary, it need only be rotated to bring the leaves into the positions previously opposite the spaces between the leaves. Thereafter, an outward movement of the tool will cleanse the spaces between the leaves previously left untouched by the insertion of the tool.

A reinsertion of the tool at this time along the cleansed surfaces, and then a rotation of the leaves, will bring those leaves just above the material previously left in the nostril. Then, an outward movement of the tool will fully cleanse the nostril.

It will be readily seen that two insertions of the tool will be really all that is necessary to thoroughly clean the nostril. Incidentally, the leaves are resilient, and of course, are more resilient in the direction of the insertion into the nostril than they are against movement outwardly from the nostril. There is, therefore, available a relatively stiff rubber surface for propelling the material out of the nostril, as will be readily appreciated.

In a further modification of the invention, instead of using but one series of leaves in clover leaf design, I employ a large number spaced about the sides of the tool and operable in a manner somewhat similar to the manner of the preferred embodiment of my invention.

Referring now to the drawing, Fig. 1 is a perspective view of my invention, while Fig. 2 is a view looking down on the clover leaf portion of my implement. Fig. 3 shows the clover leaf rotated prior to movement outwardly from the nostril. Fig. 4 is a section through lines 4—4 of Fig. 2. Fig. 5 is a perspective view of a modification of my invention.

Referring now more particularly to the drawing, my invention comprises preferably a rubber stem-like portion 10 having a bulging part 11 to limit the insertion of an upper stem portion 12 into the nostril. A series of leaves 13 are formed and secured to the end of the stem portion 12, and are arranged in the form of a clover leaf, as is quite apparent. Each of the leaves terminates in a feather edge 14, which feather edge in turn terminates in a point 15, as is shown in Figs. 1 and 4.

In practice, the tool is inserted into a nostril with the leaves 13 aligned as shown in Fig. 2. This will, of course, force back the material in the nostril, as will be readily appreciated, the spaces 16 between the leaves 13 permitting breathing of the infant and leaving an uncleansed surface. Also, the leaves are sufficiently resilient so that they will bend and conform to the particular size of the nostril being cleansed.

When the implement has been fully inserted to a predetermined position in the nostril, it may be rotated to bring the leaves 13 from the position of Fig. 2 to the position of Fig. 3. Thereafter, withdrawal of the tool will cleanse the surfaces of the nostril which were opposite the spaces 16 at the time of the insertion of the tool into the nostril. A reinsertion of the tool will cleanse the nostril of the material pushed back by the first insertion of the tool, and in a manner already generally described previously.

In Fig. 5, I show a modification of my invention in which there is a stem portion 17, a bulging portion 18 for limiting the insertion of the implement, and an upper stem portion 19 to which are secured a series of leaves 20. The leaves of this modification will operate somewhat in the manner of the leaves of my first modification, but probably not so well in the nostril of an infant.

While I have shown a preferred modification of my invention and a variation of the same, I believe that I have made a valuable contribution to the art, and I intend to claim my invention broadly so as to prevent the utilization of the principle of my invention by those skilled in the art, who will readily devise varying forms of the same.

I now claim:

1. A nose cleaning implement comprising a stem, and a cleaning portion substantially clover leaf in form at the end of said stem and adapted to be inserted into a nostril and then withdrawn therefrom for cleaning said nostril.

2. A nose cleaning implement comprising a stem, and a cleaning portion substantially clover leaf in form at the end of said stem having the leaf portions thereof flexible in one direction to facilitate insertion into a nostril, and relatively stiff in the opposite direction whereby to wipe the surface of the nostril as they are withdrawn therefrom.

3. A nose cleaning implement comprising a stem, spaced leaves secured to the end of the stem for insertion into a nostril, the spaces between said leaves being arranged to leave untouched the surfaces of the nostril opposite said spaces as said implement is inserted, whereby when said stem and leaves are rotated somewhat after insertion into a nostril and withdrawn from the nostril, the said untouched surfaces are cleaned.

4. A nose cleaning implement comprising a stem, spaced leaves secured to the end of the stem for insertion into a nostril, the spaces between said leaves being arranged to leave untouched the surfaces of the nostril opposite said spaces as said implement is inserted, whereby when said stem and leaves are rotated somewhat after insertion into a nostril and withdrawn from the nostril, the said untouched surfaces are cleansed, the said leaves being flexible in one direction to facilitate insertion into a nostril, and relatively stiff in the opposite direction whereby to better wipe the surfaces of the nostril.

5. A nose cleaning implement comprising a one piece rubber stem and spaced leaves secured to the end of the stem for insertion into a nostril, the spaces between said leaves being arranged to leave untouched the surfaces of the nostril opposite said spaces, whereby when said stem and leaves are rotated somewhat after insertion into a nostril and withdrawn from the nostril, the said untouched surfaces are cleaned.

6. A nose cleaning implement comprising a one piece rubber stem and spaced leaves secured to the end of the stem for insertion into a nostril, the spaces between said leaves being arranged to leave untouched the surfaces of the nostril opposite said spaces, whereby when said stem and leaves are rotated somewhat after insertion into a nostril and withdrawn from the nostril, the said untouched surfaces are cleaned, the said leaves being flexible in one direction to facilitate insertion into the nostril, and relatively stiff in the opposite direction whereby to better wipe the surfaces of the nostril.

7. A nose cleaning implement comprising a one piece rubber stem and a cleaning portion substantially clover leaf in form at the end of said stem, adapted to be inserted into a nostril and then withdrawn therefrom for cleaning said nostril.

8. A nose cleaning implement comprising a stem, and a cleaning portion substantially clover leaf in form at the end of said stem adapted to be inserted into a nostril and then withdrawn therefrom for cleaning said nostril, said leaves terminating in a thin peripheral feather-like surface.

9. A nose cleaning implement comprising a stem, and a cleaning portion substantially clover leaf in form at the end of said stem having the leaf portions thereof flexible in one direction to facilitate insertion into a nostril, and relatively stiff in the opposite direction whereby to wipe the surface of the nostril as they are withdrawn therefrom, said leaves terminating in a thin peripheral feather-like surface extending to a point.

10. A nose cleaning implement comprising a rubber stem and flexible leaves on said stem adapted to be inserted into a nostril and then withdrawn therefrom for cleaning said nostril, said leaves terminating in a thin peripheral feather-like surface.

11. A nose cleaning implement comprising a rubber stem and flexible leaves on said stem adapted to be inserted into a nostril and then withdrawn therefrom for cleaning said nostril, said leaves terminating in a thin peripheral feather-like surface extending to a point.

12. A nose cleaning implement comprising a stem, and a cleaning portion substantially clover leaf in form at the end of said stem adapted to be inserted into a nostril and then withdrawn therefrom for cleaning said nostril, and means limiting the insertion of said tool into the nostril.

FRANK J. DALEY.